Figure 1:
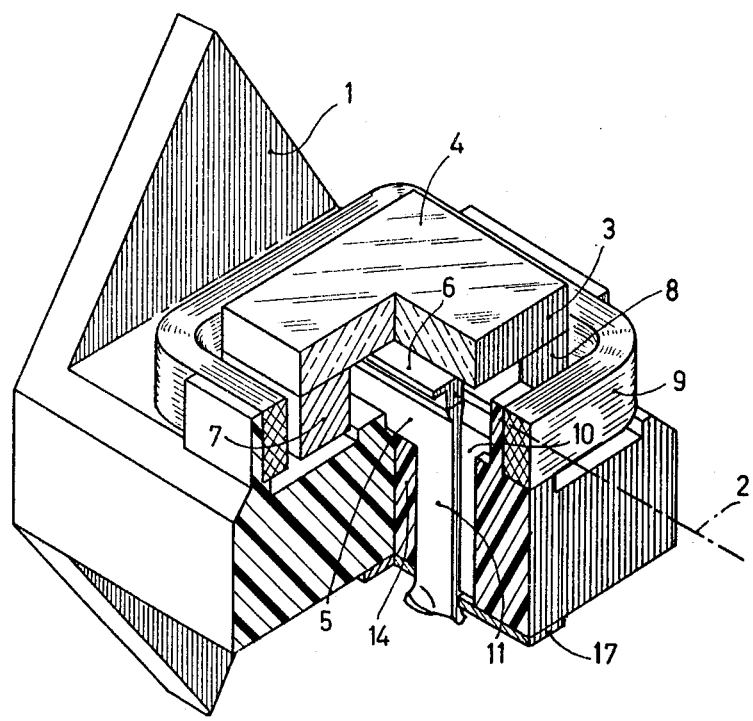

United States Patent [19]

Dragt

[11] 4,129,930
[45] Dec. 19, 1978

[54] METHOD OF MANUFACTURING AN ELECTRICALLY CONTROLLABLE PIVOTING MIRROR DEVICE

[75] Inventor: Jan C. W. Dragt, Eindhoven, Netherlands

[73] Assignee: U.S. Philips Corporation, New York, N.Y.

[21] Appl. No.: 762,430

[22] Filed: Jan. 25, 1977

[30] Foreign Application Priority Data

Jan. 13, 1977 [NL] Netherlands ......................... 7700294

[51] Int. Cl.² ............................................ B21D 53/10
[52] U.S. Cl. ............................... 29/149.5 R; 248/474;
248/467; 248/476; 248/479; 248/480;
308/DIG. 2; 308/DIG. 8; 308/2 R; 308/2 A;
308/3.9; 350/6.91; 350/285; 358/128
[58] Field of Search .............. 248/474, 467, 476, 479,
248/480; 308/2 A, 2 R, DIG. 2, DIG. 8, 237 R;
358/128; 350/6, 285; 29/149.5

[56] References Cited

U.S. PATENT DOCUMENTS

| 3,312,458 | 4/1967 | Bratt .................................. 308/2 A |
| 3,544,175 | 12/1970 | Tooker ............................... 308/2 A |
| 3,544,221 | 12/1970 | Putnam .................................. 350/6 |
| 3,981,566 | 9/1976 | Frank et al. ............................ 350/6 |
| 4,011,003 | 3/1977 | Dragt .................................. 350/285 |
| 4,021,096 | 5/1977 | Dragt .................................... 350/6 |

FOREIGN PATENT DOCUMENTS

354117 6/1961 Switzerland .................................. 350/7

OTHER PUBLICATIONS

Piezoceramic Deflector, J. M. Fleischer, IBM Technical Disclosure Bulletin, vol. 13, no. 6, Nov. 1970, p. 1648.

*Primary Examiner*—C.W. Lanham
*Assistant Examiner*—V. K. Rising
*Attorney, Agent, or Firm*—Thomas A. Briody; William J. Streeter; Simon L. Cohen

[57] ABSTRACT

A method of manufacturing an electrically controllable pivoting mirror device for an optical video-disc player, which pivoting mirror device comprises a frame as well as a mirror which with the aid of a plastics bearing with a height of less than 3 mm is fixed to a bearing support. The elastic bearing is first manufactued as a finished part and it is not until after this that it is connected to the pivoting mirror and, as the case may be, to the bearing support. In accordance with a suitable embodiment of the method the bearing is manufactured from chloroprene rubber with the aid of a molding process and is connected to the bearing support during the molding process.

8 Claims, 3 Drawing Figures

METHOD OF MANUFACTURING AN ELECTRICALLY CONTROLLABLE PIVOTING MIRROR DEVICE

The invention relates to a method of manufacturing an electrically controllable pivoting mirror device which is suitable for an apparatus for optically reading information tracks of an information carrier with the aid of a beam of radiation, or for writing information tracks on an information carrier. More specifically to a manufacturing method suitable for an optical video disc player and of a type as described in the applicant's U.S. Pat. No. 4,021,096, issued May 3, 1977. Such a player comprises: a frame; a pivoting mirror which is mounted on the frame so as to be pivotable about a pivoting axis or pivoting point and with a radiation-reflecting surface at a front side and a rear side opposite thereto; as well as a mirror bearing arrangement which comprises a rigid stationary bearing support and a rubber-like elastic bearing which on one side is connected to the bearing support and on the other side exclusively to the rear side of the pivoting mirror. The bearing support at its side which faces the rear side of the pivoting mirror has a cross-section which is substantially smaller than the surface area of said rear side. Furthermore the distance between the bearing support and the rear side of the mirror is less than 3 mm.

The Applicant's U.S. Pat. No. 4,021,096 describes a pivoting mirror device of the type mentioned in the preamble, which device is manufacture in accordance with a method which has been successfully employed by the applicant and in accordance with which the bearing is made of a silicon rubber. The bearing is made by applying a molding compound between the pivoting mirror and the bearing support and subsequently allowing this to cure in situ. Although this method enables the manufacture of excellent pivoting mirror devices, the method is considered to be less suitable for large-scale manufacture for example for video disc players. This is mainly owing to the comparatively long curing time (several hours, preferably 12 hours) which is necessary to allow the molding compound of silicon rubber to cure. During the long curing time the pivoting mirror and the bearing support cannot be subjected to assembly operations and should be maintained in an accurately defined position relative to each other. It is an object of the present invention to provide a method of the type mentioned in the preamble which is better adapted to mass-production and which is characterized in that the elastic bearing is first manufactured as a finished part and is subsequently connected to the pivoting mirror at a later stage.

In accordance with this method the elastic bearing can be manufactured from a suitable, preferably quick-curing plastic, in a special plastics processing plant where the necessary know-how and experience required for the mass production of such a small component is available. The mirror, bearing support and bearing are assembled when the pivoting mirror device is mounted. In accordance with the invention the bearing can for example advantageously be glued to the mirror. For this purpose a type of glue may be selected which is such that immediately after gluing the assembly consisting of the mirror, the bearing support and the bearing may be regarded as one assembled unit and may be handled for further assembly operations. A suitable type of glue is commercially available under the designation Loctite AIS 04 E.

In accordance with an other characteristic feature of the invention, the bearing can be connected to the bearing support by forming a recess in the bearing support and clamping the bearing in said recess.

An embodiment which is suitable for clamping the bearing in the bearing support is characterized in that the bearing support at its end which faces the rear side of the mirror is split and when the bearing is to be fitted the slot is widened with the aid of an auxiliary tool, the bearing is fitted in the bearing support and subsequently the auxiliary tool is removed.

The material of the plastics bearing should comply with a variety of requirements. As an example, the material should have satisfactory damping properties, be resistant to temperature variations and ageing, have sufficient mechanical strength and furthermore allow rapid and cheap manufacture. The bearing can advantageously be manufactured from chloroprene rubber which combines the said properties to a satisfactory extent. It is possible to first manufacture a profile oblong intermediate product with the aid of an extrusion process and subsequently in a following phase to divide this intermediate product into a number of parts which each constitute a bearing. The bearings thus manufactured can subsequently be connected to the mirrors and the bearing supports.

Another suitable embodiment of the method in accordance with the invention is characterized in that the bearing is manufactured in a mold by means of a molding process. The advantage of this embodiment mainly resides in the high dimensional accuracy of the bearings thus manufactured. Moreover, this embodiment may be modified to obtain a further embodiment which is characterized in that first of all a bearing support and, as the case may be, further bearing supports is (are) placed in a mold and subsequently the bearing(s) is (are) formed in the mold and at the same time connected to the bearing support(s). Such a method yields a bearing with a high dimensional accuracy which is already firmly attached to the bearing support in the mold. It has been found that in this way bearings made from chloroprene can be attached to the bearing support so firmly that the bond between the bearing support and the bearing is stronger than the bearing itself.

The handling of the fragile and delicate bearing is highly facilitated during assembly of the mirror device.

Figure 3:
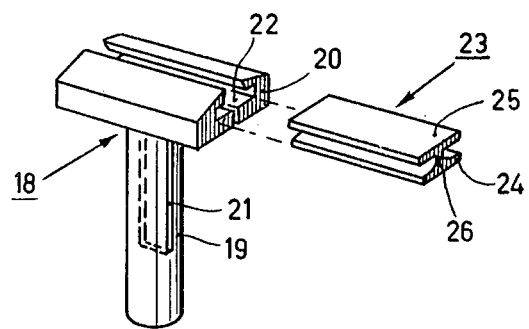
Figure 2:
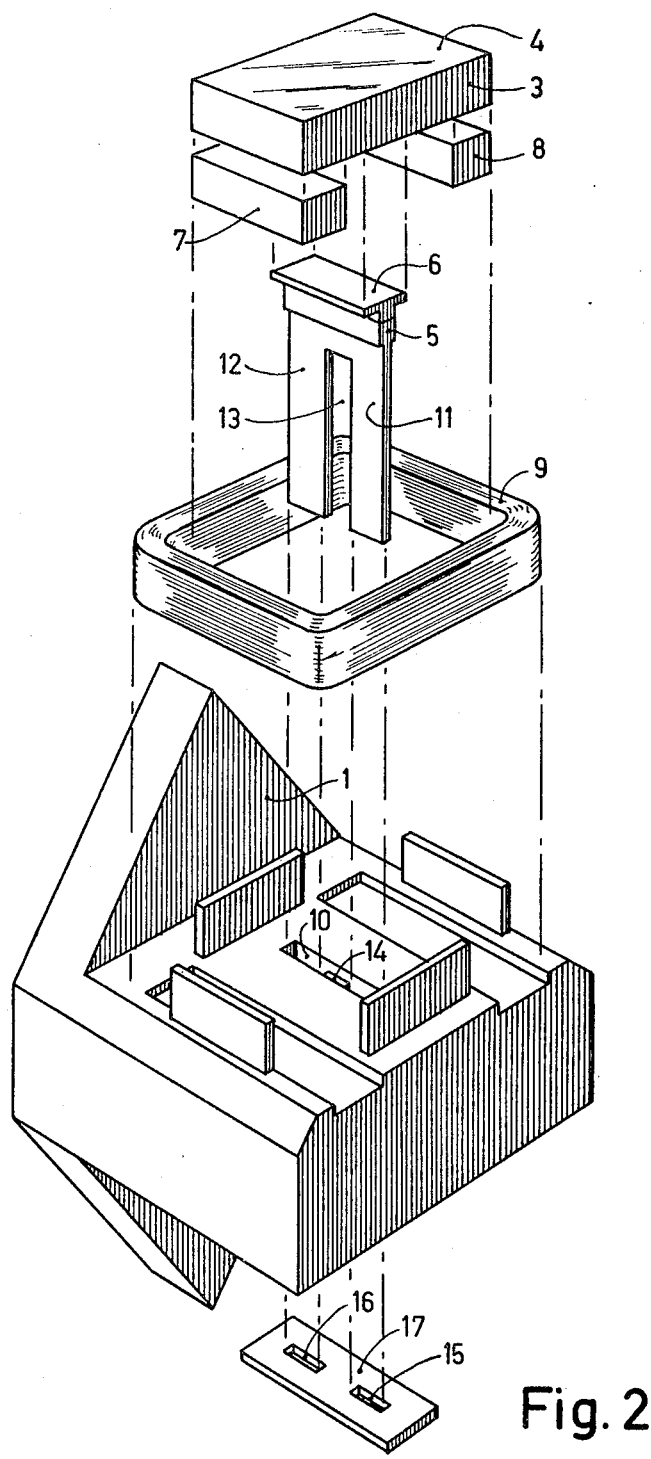

The invention will now be described in more detail by way of example with reference to the drawing, in which FIG. 1 shows a pivoting mirror device which is manufactured in accordance with the invention, FIG. 2 is an exploded view of the pivoting mirror device in accordance with FIG. 1, and FIG. 3 is an exploded view of a bearing support and a bearing in accordance with an other embodiment.

The pivoting mirror devices in accordance with the drawing are suitable for use in optical video disc players. In FIG. 1 the device comprises a plastic frame 1, a pivoting mirror 3, which is mounted on the frame so as to be pivotable about a pivoting axis 2 and which has a radiation-reflecting front side 4, and a mirror bearing arrangement which comprises a rigid stationary bearing support 5 and a rubber-like elastic bearing 6 which on one side is connected to the bearing support 5 and on the other side to the back of the pivoting mirror 3. At the back of the pivoting mirror 3 two permanent magnets 7 and 8 are mounted which co-operate with an annular coil 9 for electrically controlling pivoting movements of the mirror 3 about the pivoting axis 2.

In the frame 1 a slot 10 is formed through which two strip-shaped tabs 11 and 12 of the bearing support 5 are passed. The space 13 between the two tabs 11 and 12 has the same width as a ridge 14 which bridges the slot 10, which ridge serves for centering and supporting the bearing support 5 in the frame 1. At the underside of the frame 1 the tabs 11 and 12 project through two slots 15 and 16 in a plate 17. The bearing support 5 is connected to the frame by slightly twisting the ends of the tabs 11 and 12 which project from the plate 17. Thus, the bearing support is firmly pulled onto the ridge 14 and is rigidly attached to the frame.

The pivoting mirror device shown in FIGS. 1 and 2 employs a bearing arrangement whose bearing 6 is manufactured in a mold from polypropylene and simultaneously attached to the bearing support 5. The bearing 6 is attached to the mirror by a gluing process.

FIG. 3 shows a bearing support 18 of different construction. The bearing support consists of a cylindrical rod 19 on which a bearing head 20 is disposed. In the rod 19 a slot 21 is formed which also extends through the bearing head 20. A chloroprene bearing 23 can be clamped in a slotted recess 22 in the bearing head 20. This bearing consists of a flange 24 which is slid into the slotted recess 22 and a fixing member 25 which can be glued to the mirror. Between the flange 24 and the fixing member 25 a thin flexible portion 26 is located. To fit the bearing 23 in the bearing support 18 the slot 21 is widened with the aid of an auxiliary tool, not shown, and subsequently the flange 24 is slid into the slot 22. After removal of the auxiliary tool the bearing 23 is clamped in position in the bearing support. The bearing 23 can be manufactured by extrusion. During the extrusion process an oblong tape-like product is manufactured, after which the individual bearings 23 are obtained by cutting parts from the extrusion product. The bearing may also be manufactured by molding.

The dimensions of the pivoting mirror are approximately 10 × 13 mm at a thickness of approximately 2.5 mm. In the embodiment of FIGS. 1-2 the bearing has a height of approximately 1 mm and in the embodiment of FIG. 3 approximately 1.4 mm. In both cases the width of the member to be attached to the pivoting mirror is approximately 2.8 mm.

When a bearing support in accordance with FIG. 3 is used the frame may be provided with a cylindrical opening which corresponds to the cylindrical support 19. For the height adjustment of the bearing support relative to the frame several methods may be employed; the bearing support may for example be fixed at the correct height with the aid of a locking screw which is fitted in the frame.

I claim:

1. A method of manufacturing an electrically controllable pivoting mirror assembly of the type having a frame, a mirror pivotable about a given axis and having a reflecting front surface and an opposed rear surface, a rigid bearing support and a rubber-like elastic bearing; the method comprising the steps of forming the elastic bearing with at least one portion thereof having a T-shaped cross-section;

affixing the elastic bearing to an end of the rigid bearing support at such a location that the mirror is pivotable about said given axis, said axis being spaced from the back surface of said mirror and extending through the T-shaped portion of the elastic bearing, said bearing consisting of a substantially rectangular portion and a single rib projecting from one side thereof;

affixing a side of the rectangular portion of the elastic bearing opposite the side from which the rib projects to the rear surface of the mirror subsequent to the formation of the bearing; and affixing the rigid bearing support to said frame by said rib at a location such that the end of the rigid bearing support and the rear surface of the mirror project above a surface of the frame adjacent thereto to permit pivotal motion of the mirror.

2. A method as recited in claim 1, wherein the step of affixing the elastic bearing to the rear surface of the mirror comprises glueing the elastic bearing to the mirror.

3. A method as recited in claim 1, wherein the step of affixing the elastic bearing to an end of the rigid bearing support comprises the steps of forming a recess in the end of the bearing support, and clamping the bearing in the recess.

4. A method as recited in claim 3, wherein the step of forming the recess comprises splitting the end of the bearing support, and wherein the step of clamping the bearing comprises the steps of widening the split with an auxiliary tool, fitting the bearing into the split, and removing the auxiliary tool to permit the split to narrow about the portion of the bearing inserted therein.

5. A method as recited in claim 1, wherein the bearing material comprises chloroprene rubber.

6. A method as recited in claim 1, wherein the step of forming the elastic bearing comprises the steps of extruding a length of elastic material longer than that necessary for the mirror assembly, and subsequently dividing the extruded material into a number of bearing parts.

7. A method as recited in claim 1, wherein the step of forming the elastic bearing comprises molding said bearing.

8. A method as recited in claim 1, wherein the steps of forming the elastic bearing and affixing the elastic bearing to the bearing support comprise the steps of placing the bearing support in a mold having the shape of the elastic bearing, and molding the elastic bearing to simultaneously form the bearing and affix it to the bearing support.

* * * * *